Sept. 4, 1951 D. C. WISELEY Re. 23,408
BRAKE HOLDER SYSTEM
Original Filed April 25, 1945
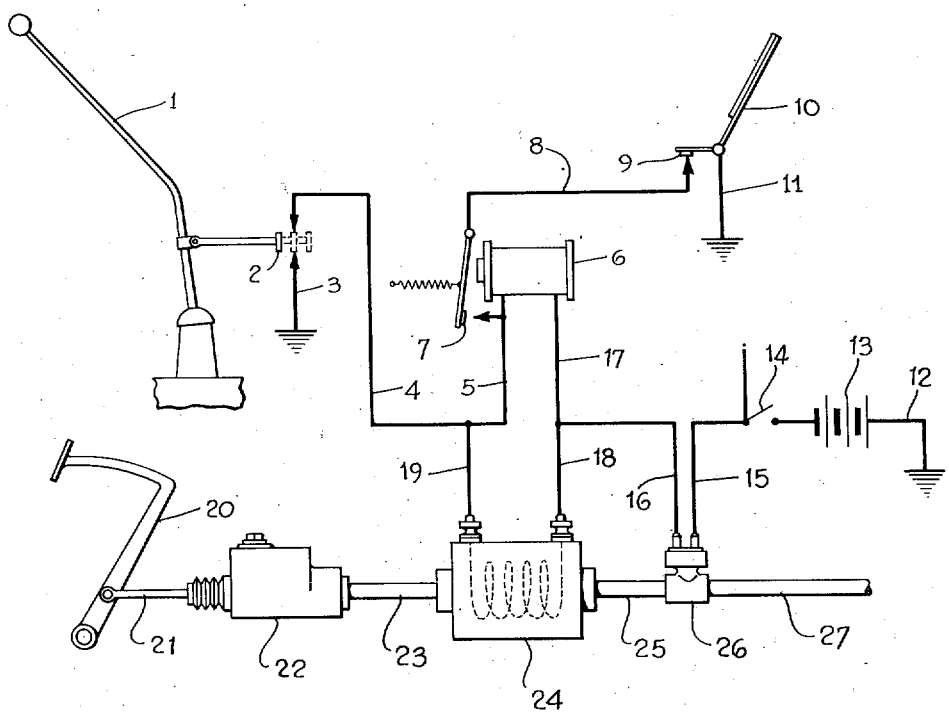
Inventor:
Dean Carlos Wiseley Reissued Sept. 4, 1951

Re. 23,408

UNITED STATES PATENT OFFICE 23,408

BRAKE HOLDER SYSTEM

Don Carlos Wiseley, Los Angeles, Calif., assignor to William F. Penrose, Newark, N. J.

Original No. 2,478,884, dated August 9, 1949, Serial No. 590,175, April 25, 1945. Application for reissue July 26, 1950, Serial No. 176,027

8 Claims. (Cl. 192—4)

Matter enclosed in heavy brackets [ ] appears in the original patent but forms no part of this reissue specification; matter printed in italics indicates the additions made by reissue.

This invention relates to motor vehicles equipped with hydraulic brakes.

More particularly, it relates to hydraulic braking systems of motor vehicles provided with means for automatically retaining the brakes of the vehicle in applied position at the conclusion of a braking operation; and to the controls therefor.

The principal purpose of this invention is to provide a fluid pressure braking system for motor vehicles, having conventional controls, with means for automatically retaining the brakes of the vehicle in applied position, at the conclusion of a braking operation, when the vehicle is ascending an incline, or, when the vehicle is descending an incline, or, when it is immobile on a comparatively level roadway, and to couple the retaining means with the controls of the vehicle so that movement of the controls automatically operates and releases the retaining means.

Another object of this invention is to provide a motor vehicle with automatic brake retaining means that will permit the driver of the said vehicle to perform his driving operation safely.

Yet another object of the present invention is to provide a motor vehicle with automatic brake retaining means that will not interfere with the normal driving operations of the driver of the said vehicle.

Other objects and advantages of the invention will become apparent from the following specification and by reference to the accompanying drawing forming a part thereof.

Having reference to the drawing, the fluid brake system, partially illustrated, consists of the conventional master cylinder 22, brake pedal 20, and piston connection 21, whereby fluid from the master cylinder is adapted to be forced by operation of the brake pedal from the master cylinder to the wheel cylinders for operation of the wheel brakes in a conventional manner. In the arrangement illustrated, the fluid passes from the master cylinder by way of pipe connection 23, hydro-electric valve 24, and conduit 27, leading to the conventional wheel cylinders, not shown. A hydraulic pressure switch 26, is connected in line 27, by fixture 25, to be responsive to prevailing pressure conditions in line 27.

A primary electrical circuit is provided in cooperation with the fluid brake system and includes therein, a source of battery 13, ignition switch 14, pressure switch 26, the operating coil of the hydro-electric valve 24 and a switch 2, actuated by the conventional gear-shifting mechanism 1. The circuit may be traced from ground 12, battery 13, ignition switch 14, wire 15, pressure switch 26, wires 16—18, the operating coil of the hydro-electric valve 24, wires 19—4 and switch 2, to ground 3.

A secondary electrical circuit is provided in cooperation with the primary circuit and includes therein, a source of battery 13, ignition switch 14, pressure switch 26, the operating coil of a relay 6 and a switch 2. The circuit may be traced from ground 12, battery 13, ignition switch 14, wire 15, pressure switch 26, wires 16—17, the operating coil of the relay 6, wires 5—4 and switch 2, to ground 3.

A holding circuit is provided in cooperation with the secondary circuit and includes therein, a source of battery 13, ignition switch 14, pressure switch 26, the operating coil of the relay 6 and switch 9, actuated by the conventional accelerator pedal 10. The circuit may be traced from ground 12, battery 13, ignition switch 14, wire 15, pressure switch 26, wires 16—17, the operating coil of relay 6, armature contact 7 of relay 6, wire 8 and accelerator pedal switch 9, to ground 11.

The hydro-electric valve 24, is installed in the fluid line between the master cylinder 22, and the front or rear wheels of the braking system or both, and is designed when operated, to close and trap the brake fluid within the wheel cylinders and to hold the brakes in their operated position. The valve is preferably of the solenoid type disclosed and claimed in my United States Patent No. 2,262,842, granted November 18, 1941, although any type of an electrically operated valve designed particularly for a similar purpose may be used. The valve, briefly described, is of the solenoid type with its operating coil included in the electrical circuit, and its arrangement is such that, normally, the valve will allow unimpeded flow of fluid from the master cylinder to the wheel cylinders, or vice-versa, but when energized, it will check and prevent flow from the wheel cylinders to the master cylinder, while still permitting flow in the original direction. Thus, when energized the valve causes the fluid to be trapped within the wheel cylinders to hold the brakes in their applied position.

The hydraulic switch 26, is so positioned as to be open to the brake fluid line between the hydro-electric valve and the wheel cylinders. It is designed to close an electrical circuit when the pressure of the brake fluid is increased by pressure upon the brake pedal. The well known hydraulic stop-light switch used on automobiles is suitable for the purpose. The switch holds the circuit closed as long as the brake fluid pressure is maintained in the fluid line but it is normally open when pressure is not applied to the brake pedal; thereby conserving battery current and assisting in the automatic operation of the holding equipment.

The relay 6 is one of those whose contact elements are normally in open position and closed when the relay is operated. One of the contact elements is wired to the ground side of the coil winding and thereby extends the circuit of the winding when the relay is operated. The well known automobile horn relay is suitable for the purpose. The operating winding of the relay is arranged in multiple with the operating coil of the hydro-electric valve so that whenever the circuit of the hydro-electric valve is completed, a circuit is also completed through the operating winding of the relay.

The switch 2 is arranged to close an electrical circuit when the gear-shifting mechanism is shifted to neutral position and to open the circuit when the gear-shifting mechanism is moved to either its forward or backward running position.

The switch 9 is arranged to hold an electrical circuit closed when its actuating accelerator pedal is in a normal or un-operated position and opens the circuit when the accelerator pedal is depressed.

Operation.—The electrical circuit of the system is primarily under the control of the ignition switch 14. With the ignition switch in its "on" position, the operating circuit of the hydro-electric valve 24 is open at the pressure switch 26, when no pressure is present in the fluid line, and at switch 2, when the gear-shifting mechanism is in either a forward or backward running position. Pressure exerted upon the brake pedal, as when applying the brakes, induces pressure in the brake fluid line and closes the electrical circuit at the pressure switch 26; but, the circuit would still remain open at switch 2, if the gear-shifting mechanism is in running position. Under these conditions, the flow of pressure fluid through the hydro-electric valve would be unimpeded in either direction, and the brakes would hold or release in response to movement of the brake pedal. However, were the gear-shifting mechanism in neutral or non-running position, and were the brake pedal to be depressed, an electrical circuit would be established through the operating winding of the hydro-electric valve, and the valve would operate to check and prevent flow of pressure fluid from the wheel cylinders to the master cylinder. The brakes would now hold in their applied position, irrespective of whether or not pressure was subsequently removed from the brake pedal.

Since the operating winding of relay 6 is in multiple with the operating coil of the hydro-electric valve 24, whenever an electrical circuit is completed through the operating coil of the hydro-electric valve, an electrical circuit is also completed through the operating winding of the relay 6, and relay 6 would thereby be operated.

Since the ground side of the operating winding of the relay is wired to one of the contact elements of the relay, whenever the relay is operated, the circuit of the operating winding would be extended through the other contact element. The other, or armature contact element, is wired to switch 9, by wire 8. If the accelerator pedal 10, which actuates the switch 9, is in normal or non-depressed position, the circuit through the contact elements and winding of the relay would be completed to ground at 11. A holding or locking circuit would thereby be established through the operating winding of the relay. The relay would continue to be held in its operated position as long as the accelerator pedal were in a normal or non-depressed position, irrespective of whether or not the gear-shifting mechanism was subsequently moved to running position. Since the operating winding of the relay and the operating coil of the hydro-electric valve are in multiple with each other, the hydro-electric valve will also be held operated and hold the brakes in their applied position.

Obviously, whenever it is desired to release the brakes under these conditions, the accelerator pedal needs only to be depressed.

It is believed that the expressed purposes for which this invention was conceived have been achieved.

While the invention has been described in connection with the preferred embodiments thereof, it is understood that the words which have been used are words of description, rather than of limitation. Changes within the purview of the appended claims may be made without departing from the true scope and spirit of the invention in all its aspects.

I claim:

1. In combination with the fluid pressure braking system of a motor vehicle having accelerator and gear-shifting mechanisms; a hydro-electric valve for trapping fluid in the system, a first electrical switch associated with the said gear-shifting mechanism, a second electrical switch associated with the said accelerator mechanism, electrical means including a source of energy for operating the hydro-electric valve under the control of the said first electrical switch, an electrical relay included in the circuit of the said electrical means, and a holding electrical circuit for the said relay under the control of the said second electrical switch and including the contact elements of the said relay.

2. In combination with a fluid pressure braking system of a motor vehicle having accelerator and gear-shifting mechanisms a hydro-electric valve for trapping fluid in the system, a first electrical switch associated with the said gear-shifting mechanism, a second electrical switch associated with the said accelerator mechanism, electrical means including a source of energy for operating the hydro-electric valve under the control of the said first electrical switch, an electrical relay included in the circuit of the said electrical means, and a holding electrical circuit for the said hydro-electric valve under the control of the said second electrical switch and including the contact elements of the said relay.

3. In combination with the fluid pressure braking system of a motor vehicle having accelerator and gear-shifting mechanisms; a hydro-electric valve for trapping fluid in the system, a first electrical switch associated with the said gear-shifting mechanism, a second electrical switch associated with the said accelerator mechanism, electrical means including a source of energy for operating the hydro-electric valve under the control of at least one of the said first and second electrical switches, an electrical relay included in the circuit of the said electrical means, and a locking electrical circuit for the said relay under the control of at least one of the said first and second electrical switches and including the contact elements of the said relay.

4. In combination with the fluid pressure braking system of a motor vehicle having accelerator and gear-shifting mechanisms; a hydro-electric valve for trapping fluid in the system, a first electrical switch associated with the said gear-shifting mechanism, a second electrical switch associated with the said accelerator mechanism, electrical means including a source of energy for operating the hydro-electric valve under the control of at least one of the said first and second electrical switches, an electrical relay included in the circuit of the said electrical means, and a locking electrical circuit for the hydro-electric valve under the control of at least one of the said first and second electrical switches and including the contact elements of the said relay.

*5. In a vehicle having an accelerator, a gear shift lever, a current source, and a fluid-operated brake system including a pipe line for conducting the fluid toward and away from the brake to apply and release the same, respectively, the combination of an electro-magnetic valve in said line, the valve having a valve member for controlling return flow through the line from the brake, and a coil operable when energized to hold the valve member in a position for blocking said return flow, the valve member upon deenergizing of the coil being movable to a position for allowing said return flow, an energizing circuit for the valve coil including said source and a switch having a member connected to the gear shift lever and adapted to be actuated manually to a position for closing the coil circuit and thereby blocking said return flow, a holding device coacting with the switch and operable to maintain the valve coil energized from the source upon movement of the switch away from said closing position, a second switch electrically connected to the holding device and operable to render the same ineffective and thereby de-energize the coil to allow said return flow, and an operative connection between the accelerator and said second switch for actuating the second switch.*

*6. A combination as defined in claim 5, in which said first switch is grounded to the vehicle through the gear shift lever.*

*7. In a vehicle having an accelerator, a gear shift lever, a current source, and a fluid-operated brake system including a pipe for conducting the fluid toward and away from the brake to apply and release the same, respectively, the combination of an electro-magnetic valve in said line operable when de-energized to permit flow in both directions through the line and when energized to permit flow through the line only in the direction of the brake, a normally open switch having a member connected to the gear shift lever and operable manually thereby, a second switch having an operative connection with the accelerator and normally held thereby in closed position, electrical connections between the current source and said valve and first switch for energizing the valve to block return flow from the brake upon operation of said switch member, a relay electrically connected to the first switch and operable upon closing thereof, and electrical connections, including the second switch, for maintaining the relay and valve energized from the source upon said operation of the relay and after opening of said first switch, whereby return flow through the valve is blocked until de-energizing of the relay by actuation of the accelerator to open the second switch.*

*8. A combination as defined in claim 7, in which said last electrical connection includes said accelerator connection.*

DON CARLOS WISELEY.

REFERENCES CITED

The following references are of record in the file of this patent or the original patent:

UNITED STATES PATENTS

| Number | Name | Date |
|---|---|---|
| 2,197,721 | Goepfrich | Apr. 16, 1940 |
| 2,217,141 | Sprenkle | Oct. 8, 1940 |
| 2,262,842 | Goepfrich | Nov. 18, 1941 |
| 2,329,156 | Coffey | Sept. 7, 1943 |
| 2,345,280 | Morgan | Mar. 28, 1944 |